Aug. 31, 1937.  C. O. COZZENS  2,091,272
OPHTHALMIC MOUNTING
Original Filed Dec. 27, 1932  3 Sheets—Sheet 1
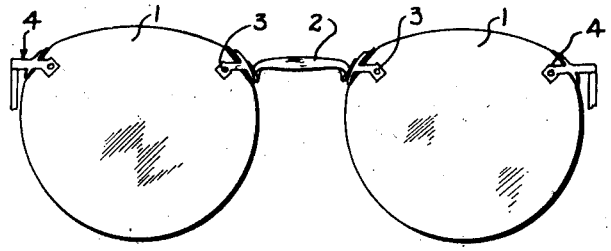
FIG. I.
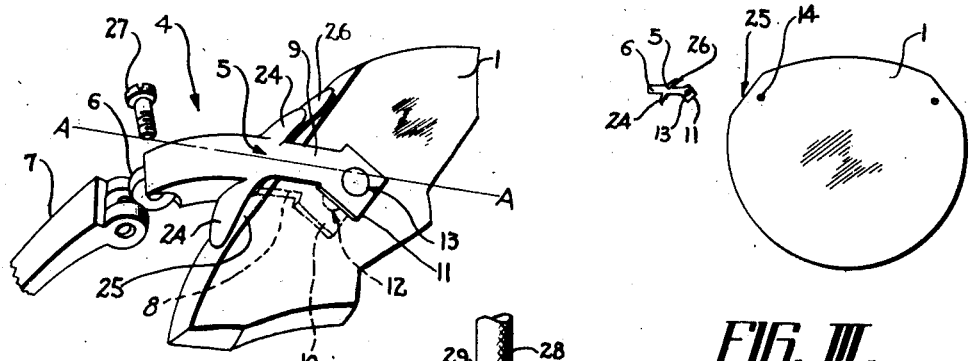
FIG. II.  FIG. V.  FIG. III.
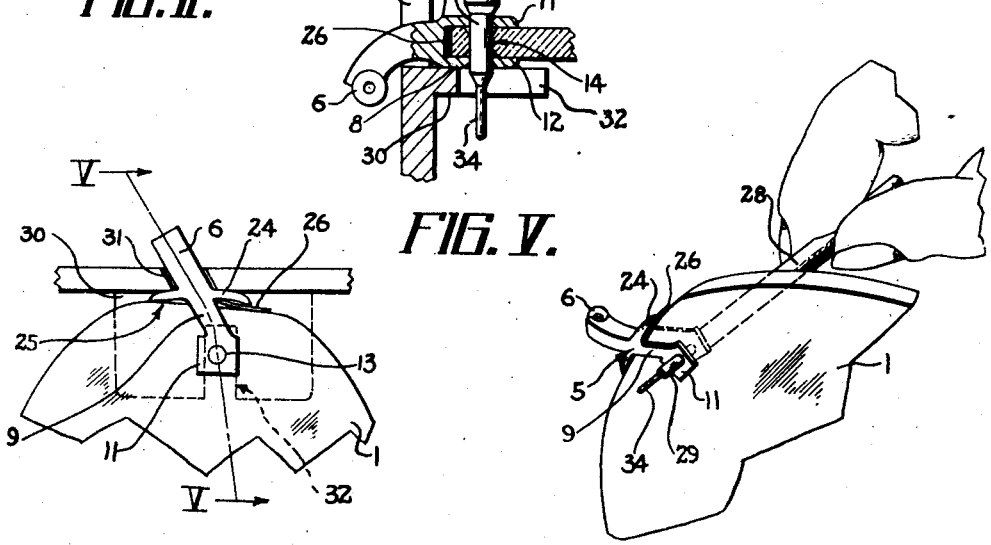
FIG. IV.  FIG. VI.
INVENTOR
Charles O. Cozzens.
BY
Harry H. Styll
ATTORNEY Aug. 31, 1937. C. O. COZZENS 2,091,272
OPHTHALMIC MOUNTING
Original Filed Dec. 27, 1932 3 Sheets-Sheet 2
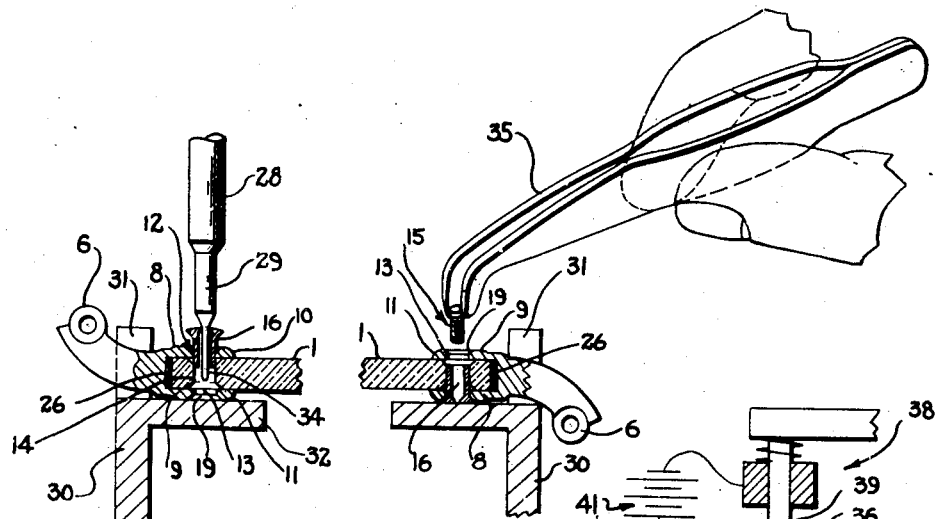
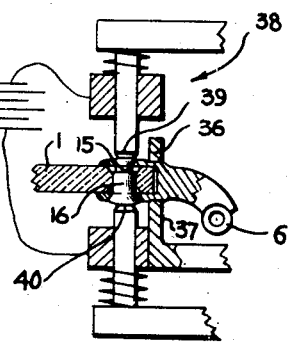
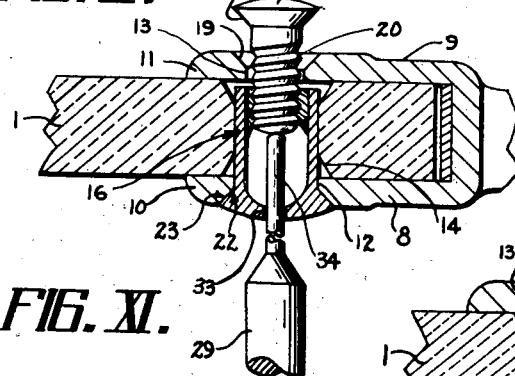
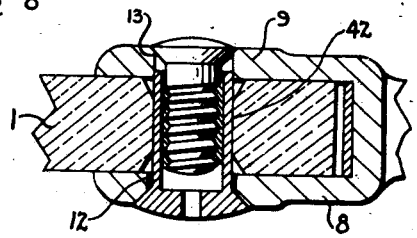
INVENTOR
Charles O. Cozzens.
BY
Harry H. Styll
ATTORNEY Aug. 31, 1937.  C. O. COZZENS  2,091,272
OPHTHALMIC MOUNTING
Original Filed Dec. 27, 1932  3 Sheets-Sheet 3
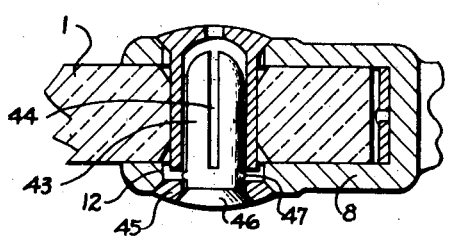
FIG. XIII.
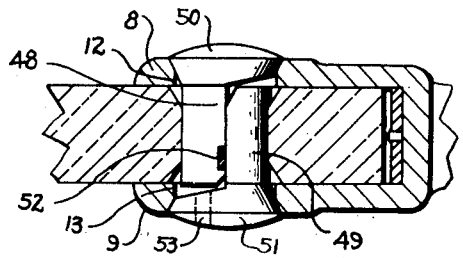
FIG. XIV.
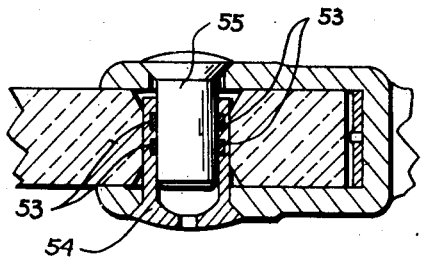
FIG. XV.
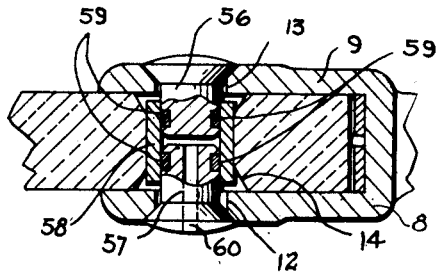
FIG. XVI.
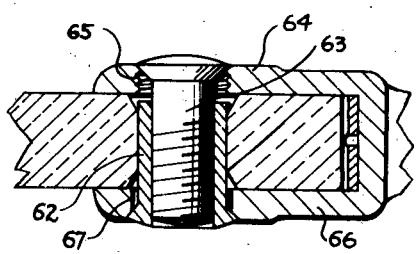
FIG. XVII.
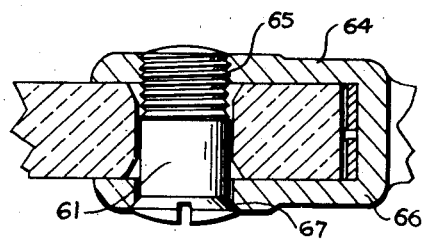
FIG. XVIII.
INVENTOR
Charles O. Cozzens.
BY
Harry H. Styll
ATTORNEY Patented Aug. 31, 1937

2,091,272

UNITED STATES PATENT OFFICE 2,091,272

OPHTHALMIC MOUNTING

Charles O. Cozzens, Southbridge, Mass., assignor to American Optical Company, Southbridge, Mass., a voluntary association of Massachusetts Application December 27, 1932, Serial No. 648,975
Renewed December 3, 1936

8 Claims. (Cl. 88—47)

This invention relates to improvements in ophthalmic mountings and has particular reference to improved lens holding means and method of making and mounting the same on lenses.

One of the principal objects of the invention is to provide a new and improved lens holding member and method of making and mounting the same on the lens so as to insure a positive and permanent connection with the lens without the use of screws or other mechanical securing devices or sticky cementitious materials.

Another important object of the invention is to provide an improved lens holding member of the above character having means incorporated therein for compensating for variation in the thickness of lenses of varying powers and curvatures and to provide better and much more inexpensive methods of mounting the said lenses wherein less experienced and less expensive operators may be quickly trained to perform the necessary operations of mounting the said lenses.

Another important object of the invention is to provide a method and means for mounting the lenses of rimless spectacles in which the parts necessary to mount the lenses may all be produced and prepared in the factory and may then be assembled in the prescription shop and in position without the use of any additional material.

Another important object of the invention is to provide an improved lens holding member that will resiliently ease off the rigidity of the connection of the lens to the holding member, that will insure the said holding member returning to its initial aligned position after such easing off, that will provide holding means applicable to the lenses in such a way as to give a stream-line horizontal appearance across the lens connections, and that will provide efficient edge bearing means when the edge of the connecting means adjacent the edge of the lens lies in a direction not normal to the horizontal axis of the holding means.

Another object is to provide improved resilient means for eliminating looseness and play in the connecting means to the lens and for eliminating strain and breakage of the lens when heat is applied to the solder connecting means.

Another object is to provide a connection which can be manufactured and placed on the market in a condition for ready use and which will materially decrease the time and labor incident to such connections.

Another object is to provide an improved solder connection for securing lenses to their mountings and an improved method of making and mounting the same on said lenses.

Another object is to provide connecting means incorporating a suitable metallic cement such as solder or other metallic alloy for uniting metals which will withstand boiling water or other tests.

Another object is to provide an improved lens holding member which is adaptable for use either with a connecting screw or with solder connecting means.

Another object is to provide a solder strap connection having improved means for carrying the solder and for increasing the solder surface of the connecting means in combination with means for aiding the securing action of the solder.

Another object is the provision of smaller and neater lens connections.

Other objects and advantages of the invention will become apparent from the following description taken in connection with the accompanying drawings, and it will be apparent that many changes in the arrangement of parts, details of construction, and in the steps of the process may be made without departing from the spirit of the invention as expressed in the accompanying claims. I, therefore, do not wish to be limited to the exact details shown and described, as the preferred forms and operations only have been shown by way of illustration.

Referring to the drawings:

Fig. I is a front elevation of an ophthalmic mounting embodying the invention;

Fig. II is an enlarged fragmentary perspective view showing one of the lens connections embodying the invention;

Fig. III is a front elevation of a lens showing the lens holding means partly removed therefrom and illustrating one of the steps in the process of mounting the lens holding means on the lens;

Fig. IV is an enlarged fragmentary plan view illustrating another step in the process of uniting the holding means to the lens;

Fig. V is a sectional view taken on line V—V of Fig. IV;

Fig. VI is a fragmentary perspective view illustrating another step in the process of uniting the holding means to the lens;

Fig. VII is a view similar to Fig. V illustrating another step of the process;

Fig. VIII is a view similar to Fig. VII illustrating another step of the process;

Fig. IX is a fragmentary sectional view illustrating a further step of the process;

Fig. X is an enlarged fragmentary sectional view illustrating the lens holding means when in secured relation with the lens;

Fig. XI is a view similar to Fig. X illustrating how the lens holding means may be removed from the lens;

Fig. XII is a view similar to Fig. X illustrating a modified form of the invention;

Fig. XIII is a view similar to Fig. XII illustrating another modification;

Fig. XIV is a view similar to Fig. XIII illustrating another modification;

Fig. XV is a view similar to Fig. XIV illustrating a further modification;

Fig. XVI is a view similar to Fig. XV illustrating a further modification;

Fig. XVII is a view similar to Fig. XVI of a further modification; and

Fig. XVIII is a similar view of a still further modification.

In the prior art it has been usual to secure the lenses to their mountings by the means of screws or the like passing through aligned holes in the lens and in the embracing parts of the mounting. One of the difficulties encountered in mountings of the above nature is that of having the lens strap connections become loose and wobbly during the use of the mounting. This necessitated the constant tightening of the connecting screws and in many instances in the past, in an effort to overcome the loosening, the said connecting means was tightened to such an extent as to set up strain in the lens and cause breakage either directly or by temperature changes alone even after the mounting operations were completed.

Another difficulty was in fitting the lens strap or holding means to lenses of varying curvatures and thicknesses, that is, in having the connecting means of sufficient length at all times to accommodate for thickness variations and in aligning the screw holes of the lens and the mounting so that the connecting screw could be placed therein in accurately fitted and snug relation with the lens without causing strain. The extreme accuracy necessary in obtaining this fitting not only required many trials and alterations of the parts of the mounting but also caused great wastage due to inaccuracies and breakage due to the fragile nature of the glass.

On account of all these difficulties, the mounting of the lenses called for expert, and consequently expensive, operators. The work had to be done with such nicety that only the most experienced could perform the work satisfactorily. The parts had to be aligned and fitted with exceeding exactness, so that there was scarcely any give and take permissible in the fitting operations.

Another difficulty encountered with some of the prior art constructions was that of the use of cement. In most instances the use of cement required an exceptionally skilled operator. Much difficulty was encountered in handling and controlling the amount of adhesive necessary to form the connection, and in most instances the surplus adhesive would flow over the surface of the lens and require the use of a special tool for removing it from said surface. It also, in most instances, required the use of a special liquid for cleaning the surface of the lens. These adhesives were slow in setting and therefore required much time in forming a usable connection.

Applicant overcomes the above defects by the provision of a construction and by the use of an adhesive which is quick setting and which can easily be applied by more or less inexperienced operators. Applicant also provides positive means for controlling and handling the amount of adhesive used, and employs an adhesive which, even if a surplus amount were applied, would melt and flow from the lens, rather than adhere thereto.

Another advantage of applicant's device is that of the provision of relatively resilient means for obviating the looseness and play in the parts of the connecting means to the lens. This resilient means obviates the necessity of having to work with extreme exactness, such as in the screw connection, and eliminates all strain at the connection to the lens.

Applicant's device is exceedingly simple in construction and forms positive and permanent means of securing the holding means to the lens. It does not require the skill of an expert and is simple and neat to handle. The complete assembling operation can be performed quickly and easily.

Referring to the drawings wherein similar reference characters designate corresponding parts throughout; the invention is applied to the usual ophthalmic mounting as shown in Fig. I, wherein a pair of lenses 1 are connected by a bridge member 2 having lens connections or straps 3 on the nasal side of the lenses and having similar connections or straps 4 on temporal side of said lenses. The lens straps 3 and 4 are similar in structure and as illustrated in Fig. II comprise a portion 5, which when viewed from the front is relatively straight and adapted to be positioned in substantially parallel relation with the horizontal axis of the lens. The portion 5 is provided adjacent one end with a connection 6 for the temple 7 and adjacent its opposite end with a bifurcated portion having spaced arms 8 and 9 between which the lens 1 is positioned. The arms 8 and 9 are provided with downwardly extending enlarged attaching ends 10 and 11 having openings 12 and 13 therein which are adapted to be aligned with an attaching opening 14 in the lens 1.

The ends 10 and 11 extend below the bottom edge of the portion 5, and the centers of the openings 12 and 13 in said ends are adapted to lie below the longitudinal axis A—A of said portion 5. The ends 10 and 11 are attached to the lens 1 by a headed pin and tube arrangement 15 and 16 as shown in Fig. X. The pin 15 extends through the opening 13 in the arm 9 and is provided with an enlarged head 17 having a beveled edge 18 which is adapted to engage with the beveled side walls 19 of said opening. The pin 15 has a threaded portion 20 which is placed in telescoped relation with the tube 16. The threads are adapted to form recesses in which solder or other adhesive means 21 may be placed and carried into the tube 16 when the parts are assembled. The threaded portion 20 increases the attaching surface area of the pin 15 internally of the tube 16 and provides novel means for aiding the solder or other adhesive means in anchoring the pin in said tube. Attention is directed to the fact that the threaded portions of the pins are provided with a predetermined amount of solder or other adhesive means when they are manufactured and that no additional solder or adhesive means is necessary to form the connection. When solder is used the parts may be provided with a suitable flux to aid the adhering action thereof.

The tube 16 extends through the opening 12 in the arm 8 and is provided with an enlarged head portion having a beveled peripheral edge 22 which is adapted to engage with the beveled side walls 23 of the opening 12. Attention is directed to the fact that the diameters of the openings 12 and 13 are greater than the outside diameters of the pin 15 and tube 16. The object of this arrangement is to provide clearance whereby the pin and tube may be rocked to different angles to compensate for changes in the thickness of lenses and the changes in the angles of the outer surfaces of different lenses relative to the axis of the openings 14 in said lenses.

When the pin 15 and tube 16 are in proper assembled relation with each other heat is applied to the connection to melt the solder or other adhesive means by an electric heater or other suitable means as shown in Fig. IX and the said solder or other adhesive is then allowed to cool and adhere to the pin and tube to unite the same. The tube 16 is provided with an opening 33 in its head for the purpose of admitting an assembling tool which will hereinafter be described in detail.

To present the straps turning about their connecting means to the lens the said straps are provided with a transversely extending portion 24 which is adapted to engage with the peripheral edge of the lens at the attaching seat 25. The portion 24 intersects the longitudinal axis of the portion 5 on an angle other than normal and at a point substantially at the base of the bifurcation. The portion 24 is shaped to fit the angle of the edge of the attaching seat 25 above the useful field of vision and to support the portion 5 in a position substantially parallel with the horizontal meridian of the lens. A reduced resilient spring section 26 is attached adjacent one of its ends to the transverse portion 24 between the arms 8 and 9 and extends outwardly beyond the upper end of said portion 24 to provide relatively resilient means for increasing the edge bearing surface of the strap above the connection. The said spring section is adapted to take up the looseness and play in the connection to the lens and act as shock absorbing means to relieve strain on the lens. The lower portion of the transversely extending portion 24 is adapted to be adjusted to bear against the peripheral edge 25 of the lens and is held in engagement with said edge through the resiliency of the spring member 26. The upper portion of the transversely extending portion 24 is adapted to overlie a major portion of the resilient member 26 and form a backing therefor which may be adjusted to vary the tension of the member 26 relative to the edge 25 of the lens. This provides positive means for taking up the looseness and play which may exist in the connection to the lens. It also provides unique means for easing off shocks and strains on the lens and provides increased bearing surface which is inconspicuous and durable.

In instances, wherein only an increased bearing surface is desired with no resiliency the member 26 may be formed of rigid material and may be separate or integral with the member 24 as desired. It will be apparent that by suitable adjustment of the lower portion of the member 24 that the portion 5 may be placed in any desired aligned relation with the lens, that is, the portion 5 may be adjusted about the lens connection as a center to vary the angle of said portion relative to the horizontal meridian of the lens. This permits the portion 5 and arms 8 and 9 to be placed substantially parallel with the horizontal meridian of the lens to produce a pleasing streamline effect across said lens.

The temple 7 is attached to the connection 6 by a connecting screw 27 in the usual manner.

The straps 3 and 4 may if desired be constructed to be attached to the lenses at a point thereon located on a horizontal line passing through the optical or geometrical centers of the lenses or at any desired location on said lenses, and may be formed with the resilient member 26 extending below the portion 24 as well as above said portion.

One of the unique features of applicant's device is the method or process of fitting the strap to the lens and of handling and assembling the parts of the connection. As shown in Fig. III the lens which has been carefully surfaced to the prescriptive requirements of the patient is first laid out, cut and edged to the shape desired and is simultaneously formed with the attaching seat 25 for the strap. The location of the connecting opening 14 is then determined, marked and drilled at the required distance from the edge of the seat.

The strap is then fitted to the seat and exact alignment of the openings is obtained by a special aligning tool 28. The tool 28 has a projecting portion 29 of the desired diameter to fit in the openings 12, 13 and 14 and is adapted to be tried in said openings to determine their size and relation and to obtain the general fit of the strap on the lens. The tool 28 is also provided with a reduced extension 34 which is adapted to be placed in the opening 33 in the tube 16 to permit ease in handling the tube. To aid in obtaining the alignment of the openings and general fit of the strap there is provided a table 30 as shown in Figures IV and V on which the lens and strap may be rested and held in desired relation with each other. The said table is formed with a slotted upright 31 in which the temple or bridge connection of the strap may be placed and held and the table proper is provided with an opening 32 adjacent the slot 31 through which the end 29 of the aligning tool 28 may extend during the testing of the alignment of the openings. In making the test for alignment the strap is first placed on the table 30 with the temple or bridge connection in the slot 31. The lens 1 is then placed between the arms 8 and 9 of the strap and is pressed toward the strap to compress the spring 26 and bring the openings 12, 13 and 14 in substantial alignment with each other. The end 29 of the tool 28 is then tried in the openings to determine their relation. If the openings are of a proper size and in aligned relation with each other the portion 29 will fit snugly in the openings and will support the strap on the lens so that it may be held up and examined for alignment, fit, etc., as shown in Fig. VI. After having obtained proper alignment and fit the tool 28 is removed from the strap and lens and a connecting tube 16 is placed on the reduced extension 34 as shown in Fig. VII and is then laid aside. A pin 15 is then placed in a pair of tweezers 35 as shown in Fig. VIII and is also laid aside. The strap and lens are then placed on the table 30 as previously described. The tool 28 and attached tube 16 are then picked up and the tube is placed in the aligned openings 12, 13 and 14 as shown in Fig. VII and the tool 28 is removed. The strap is then reversed on the table 30 and the tweezers and attached pin 15 are picked up and the pin is placed in telescoped relation with the tube 16 in the openings 12, 13 and 14 as shown in Fig. VIII and the tweezers are removed. The assembled connection is then placed between a pair of clamping jaws 36 and 37 of a heating unit 38 such as shown in Fig. IX. The pin 15 and tube 16 are pressed into snug relation with each other and with the strap by the electrical contacts 39 and 40 of the heating unit and heat is applied to the connection by a source of electrical energy such as a battery or other means 41. This heating causes the solder or other adhesive 21 to melt and flow between the pin 15 and tube 16. The connection is then allowed to cool to cause the solder or other adhesive to harden and adhere to the pin and tube to unite the same. The mounting is then ready for use.

When it is desired to remove the strap from the lens the said strap is heated by any suitable means. The reduced extension 34 of the tool 28 is then inserted through the opening 33 in the tube 16 to push out the pin 15 as shown in Fig. XI. This disunites the pin and tube and allows them to be removed from the strap.

In Fig. XII there is shown a slight modification wherein a tube 42 having sufficient length to extend through the opening 12 in the arm 8 and entirely through the lens 1 and into the opening 13 in the arm 9 on the opposite side of the lens is employed instead of the tube 16.

In Fig. XIII there is shown another modification wherein a pin 43 having a slot 44 longitudinally thereof is used instead of the pin 15. The pin 43 is provided with a beveled edge washer 45 which is adapted to fit in the opening 12 in the arm 8 of the strap and allows the pin 43 to be moved to different angles. The washer 45 is held on the pin 43 by the head 46 on said pin and fins 47 struck out from the body of the pin. The pin or tube may be coated with solder on one or the other engaging surfaces. The slot 44 is adapted to provide means whereby the pin may be quickly and easily placed in telescoped relation with the connecting tube.

In Fig. XIV there is shown a further modification wherein a pair of pin members 48 and 49 form the connecting means. The pins are each provided with an enlarged beveled edged head 50 and 51 which fit in the beveled openings 12 and 13 in the arms 8 and 9. The main body of the pins is cut away or reduced so that they may be placed in overlapped relation with each other and the engaging surfaces of said overlapped portions are adapted to be secured together by solder or other adhesive 52 carried by one or both of said pins as desired. One of the pins is provided with an opening 53 for admitting the reduced extension 34 of the tool 28 so that the said pins may be disunited if desired as previously described.

In Fig. XV there is shown a further modification wherein the solder 53 is carried by the tube 54 instead of by the pin 55. The pin in this instance is relatively smooth at its sides instead of being threaded.

In Fig. XVI there is shown a further modification wherein two pins 56 and 57 and a tube 58 are used. The tube 58 is placed in the opening 14 in the lens and the pins 56 and 57 are placed through the openings 12 and 13 in the arms of the strap and in telescoped relation with the tube. The solder or other adhesive 59 is carried by each of the pins. Attention is directed to the fact that the tube 58 is larger in diameter than the openings 12 and 13 in the arms 8 and 9 and for this reason is held in the opening 14 in the lens by said arms. One of the pins is provided with an opening 60 for the admission of the reduced extension 34 of the tool 28 to provide means whereby the connection may be disunited.

In Figures XVII and XVIII there is shown a further modification wherein provision is made for the use of a connecting screw 61 as shown in Fig. XVIII or a tube and pin structure 62 and 63 as shown in Fig. XVII. In this instance the strap is formed with an arm 64 having a threaded opening 65 therein and an opposite arm 66 with a beveled opening 67 therein. The screw 61, tube 62 and pin 63 are formed to such sizes that either may be used with the above strap. The object of this arrangement is to provide means whereby the tube and pin structure may be replaced by a standard screw so that repairs may be quickly and easily made in shops which do not carry the tube and pin replacements.

The resilient peripheral engaging means in all of the above constructions employing solder type connecting means performs an ingenious and novel function of relieving the rigidity of the solder connection on the lens and of relieving all strain and breakage of the lenses which might be caused by the expansion and contraction of the holding means when heat is applied thereto to cause the solder to melt and when the connection is allowed to cool to permit the solder to harden. The resilient means has a definite cooperative relation with the solder means of such connections during the forming thereof and provides unique means of obviating looseness and play in said connections and of absorbing shocks and strains on the lenses during the use of the mountings.

It will be understood that in all of the above instances either the pin or tube or both may be made to carry the solder or other adhesive means as desired.

From the foregoing description it will be seen that I have provided simple, efficient and inexpensive means of mounting a strap on a lens whereby the variation in thickness of lenses is taken care of automatically and all looseness and play is eliminated, together with means for relieving strain on the lens, and in which an improved method or process of handling and assembling the parts of the connection with ease and simplicity is provided in combination with means whereby the parts may be quickly and permanently secured together.

Having described my invention, I claim:

1. In a device of the character described means for holding a lens having an opening therethrough comprising a lens holding member having a pair of spaced ears, each having an opening alignable with the opening in the lens, and a bosom portion between the ears to fit over the edge of the lens, said ears having seats around the openings therein on the outer sides thereof, telescoping members in telescoped relation with each other in said openings in the ears, each having a seat seated on the seat of the ear and being so constructed as to be freely slidable longitudinally of each other and a blade spring member on the bosom portion of the lens holding member adapted to lie between said bosom and the edge of the lens and to resiliently press the lens away from said bosom to compress the freely slidable telescoping members together laterally to hold them in place in the openings in said ears while the said members are being secured together and to resiliently ease off the connection of the holding member to the lens when the parts are connected and solder-like means carried by one of said telescoping members which when said members are assembled and subjected to heat will flow therebetween and when cool will integrally unite the same.

2. In a device of the character described means for holding a lens having an opening therethrough comprising a lens holding member having a pair of spaced ears, each having an opening alignable with the opening in the lens, and a bosom portion between the ears to fit over the edge of the lens, said ears having seats around the openings therein on the outer sides thereof, longitudinally slidable members in overlapped relation with each other in said openings in the ears, each having a seat seated on the seat of the ear, a blade spring member on the bosom portion of the lens holding member adapted to lie between said bosom and the edge of the lens and to resiliently press the lens away from said bosom to compress the said aligned members together laterally to hold them in place in the openings in said ears while the said members are being secured together and to resiliently ease off the connection of the holding means to the lens when the slidable members are in secured relation with each other and solder-like means for securing the said slidable members in fixed relation with each other and to maintain the fitted relation of the holding means to the lens.

3. For use in securing a lens holder having spaced ears and aligned openings therein to a lens having and opening aligned with said openings, a securing device comprising a cap-like member having an opening therein and a seat head, said cap like member adapted to fit in the opening in the lens with its head seated on the seat of an ear of the holding member, a second member having a portion freely slidable relative to and adapted to telescope with the cap like member and having a seat head adapted to engage with the seat on the other lens ear, and a solder-like medium associated with one of said members adapted to secure them together when melted and thereafter congealed, the said opening in the cap like member being adapted to permit the insertion of means by which the second member in telescoped relation with the cap like member may be forced outwardly of said cap like member when the parts are heated and it is desired to separate said members.

4. In a device of the character described, means for holding a lens having an opening therethrough comprising a lens holding member having a pair of spaced ears, each having an opening alignable with the opening in the lens, separate connecting members axially slidable from opposite sides of the holding means into overlapped relation with each other in the aligned openings and each having a part engaging its respective ear to form a pivot connection with the lens, solder-like means associated with said overlapping members which when they are assembled and subjected to heat will flow therebetween and when cool will integrally unite the same, said overlapping members having no interlocking means at the solder-like united portions thereof other than the solder-like means, and resilient means associated with said lens holding means and lens to resiliently control the rotative movement of the lens on the connecting means in the aligned perforations thereof and to hold the parts in required aligned position.

5. In a device of the character described means for holding a perforated lens in place, comprising a lens holding member having spaced lens face engaging portions formed with perforations aligned with the perforation in the lens, means comprising a plurality of separate alignable members positioned as connecting means in the aligned perforations of the face engaging portions and lens and having portions engaging the respective face engaging portions and solder-like means securing the said alignable members together separately of the lens so that said holding means cannot be removed without destroying the solder-like connection, said separate alignable members being axially slidable into fitted relation in said aligned perforations and said assembled parts having no interlocking means at the solder-like united portions thereof other than the solder-like means, said connecting means, when in assembled relation with the lens holding means and lens, having a portion exposed for engagement by an ejecting tool, whereby heat may be applied to the parts to soften the solder-like means and because of said axially slidable fit the ejecting tool may be pressed against the exposed portion to force the connecting means out of related position with the lens holding means and lens when it is desired to remove the holding means from the lens.

6. In a device of the character described, means for connecting separable parts of an ophthalmic mounting, comprising a part having a portion formed with a perforation aligned with a perforation in the other part, means comprising a plurality of separate alignable members positioned as connecting means in the aligned perforations of said parts and having portions engaging the respective opposed outer surfaces of the assembled parts and solder-like means securing the said alignable members together separately of the parts so that said parts cannot be removed without destroying the solder-like connection, said separate alignable members being axially slidable into fitted relation in said aligned perforations and said assembled parts having no interlocking means at the solder united portions thereof other than the solder, said connecting means, when in assembled relation with the parts, having a portion exposed for engagement by a tool, whereby heat may be applied to the parts to soften the solder-like means and because of said axially slidable fit, the tool may be engaged with the exposed portion to disengage the connecting means from their related position with the parts when it is desired to remove one of said parts from the other.

7. In a device of the character described, means for holding a lens having an opening therethrough comprising a lens holding member having a portion formed with an opening alignable with the opening in the lens, separate connecting members axially slidable from opposite sides of the holding means and the lens into overlapped relation with each other in the aligned openings and each having a part engaging the respective opposed outer surfaces of the assembled parts to form a pivot connection with the lens, solder-like means associated with said overlapping members which when they are assembled and subjected to heat will flow therebetween and when cool will integrally unite the same, said overlapping members having no interlocking means at the solder-like united portions thereof other than the solder-like means, and resilient means associated with said lens holding means and lens to resiliently control the rotative movement of the lens on the connecting means in the aligned perforations thereof and to hold the parts in required aligned position.

8. The process of securing together the separable holding parts of an ophthalmic mounting having alignable openings therein, comprising providing a plurality of separate alignable connecting members with body portions of less size than the diameters of the openings positionable as connecting means in the openings of said holding parts of said ophthalmic mounting by sliding axial movement, said connecting members having portions to engage the respective opposed outer sides of the assembled holding parts and because of the size of said body portions being movable relative to said holding parts and having no positive means for interlocking with each other, fitting the said holding parts together and aligning the openings thereof, and effecting an assemblage of said holding parts and connecting members with solder-like connecting means whereby the said connecting members may be secured together separately of the holding parts so that one of said parts cannot be removed from the other without destroying the solder-like connection, said assemblage including sliding said connecting members axially into fitted relation in said aligned openings of the holding parts with a portion of said connecting means exposed for engagement by a disassembling tool and subjecting said connecting members to heat to cause the solder-like means to melt and flow between said connecting members and to harden on cooling and unite the same, the relation of said assembled connecting members and holding parts being such that when it is desired to separate the connecting members from the holding parts heat may be applied thereto to soften the solder-like means and because of said axially slidable fit a disengaging tool may be engaged with the exposed portion to disengage the connecting members from their related position with the holding parts of the ophthalmic mounting to remove one of said parts from the other.

CHARLES O. COZZENS.